(12) United States Patent
Seok (10) Patent No.: US 10,004,109 B2
(45) Date of Patent: Jun. 19, 2018

(54) METHOD AND APPARATUS FOR RECOVERING DATA UNIT IN WIRELESS COMMUNICATION SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/907,704

(22) PCT Filed: Jun. 19, 2014

(86) PCT No.: PCT/KR2014/005410
§ 371 (c)(1),
(2) Date: Jan. 26, 2016

(87) PCT Pub. No.: WO2015/034166
PCT Pub. Date: Mar. 12, 2015

(65) Prior Publication Data
US 2016/0164638 A1 Jun. 9, 2016

Related U.S. Application Data

(60) Provisional application No. 61/874,413, filed on Sep. 6, 2013.

(51) Int. Cl.
*H04W 84/12* (2009.01)
*H04W 72/02* (2009.01)
(Continued)

(52) U.S. Cl.
CPC ............ *H04W 84/12* (2013.01); *H04L 1/08* (2013.01); *H04L 69/14* (2013.01); *H04L 69/323* (2013.01); *H04W 24/00* (2013.01); *H04W 72/02* (2013.01)

(58) Field of Classification Search
CPC .............................. H04W 84/12; H04W 72/02
See application file for complete search history.

(56) References Cited

U.S. PATENT DOCUMENTS

| 6,690,657 B1* | 2/2004 | Lau .................... H04B 7/15542 370/315 |
| 2002/0131393 A1* | 9/2002 | Baldridge ......... H04W 74/0875 370/343 |

(Continued)

FOREIGN PATENT DOCUMENTS

| KR | 10-2012-0093320 A | 8/2012 |
| KR | 10-2013-0009827 A | 1/2013 |

(Continued)

*Primary Examiner* — Joseph D Torres
(74) *Attorney, Agent, or Firm* — Birch, Stewart, Kolasch & Birch, LLP (57) ABSTRACT

Disclosed are a method and an apparatus for recovering data units in a wireless communication system. The method of recovering data units in a wireless LAN comprises the steps of: determining a channel state of at least one secondary channel band for a predetermined time after an STA has failed to transmit a first PPDU; and transmitting, at the STA, a second PPDU through a recovery channel band determined on the basis of the channel state, wherein the first PPDU is data transmitted through a primary channel and at least one secondary channel, and the recovery channel band may include, from among the primary channel band and at least one secondary channel, a secondary channel that is in an idle state.

10 Claims, 10 Drawing Sheets

(51) Int. Cl.
*H04W 24/00* (2009.01)
*H04L 1/08* (2006.01)
*H04L 29/08* (2006.01)
*H04L 29/06* (2006.01)

(56) References Cited

U.S. PATENT DOCUMENTS

| | | | |
|---|---|---|---|
| 2004/0264475 A1* | 12/2004 | Kowalski | H04L 12/5693 370/395.5 |
| 2006/0159003 A1* | 7/2006 | Nanda | H04W 16/10 370/203 |
| 2006/0223541 A1* | 10/2006 | Famolari | H04W 72/02 455/450 |
| 2007/0263702 A1* | 11/2007 | Kwon | H04B 1/713 375/135 |
| 2008/0320354 A1* | 12/2008 | Doppler | H04L 1/04 714/748 |
| 2009/0285116 A1* | 11/2009 | Nanda | H04W 72/02 370/252 |
| 2011/0025144 A1 | 2/2011 | Schartman et al. | |
| 2011/0162019 A1* | 6/2011 | Lee | H04H 20/08 725/81 |
| 2012/0213204 A1 | 8/2012 | Noh et al. | |
| 2012/0230448 A1* | 9/2012 | Kang | H03M 13/6527 375/295 |
| 2012/0327915 A1 | 12/2012 | Kang et al. | |
| 2013/0077497 A1* | 3/2013 | Bae | H04W 74/0858 370/241 |

FOREIGN PATENT DOCUMENTS

| | | |
|---|---|---|
| WO | WO 2011/099791 A2 | 8/2011 |
| WO | WO 2012/064502 A1 | 5/2012 |

\* cited by examiner

METHOD AND APPARATUS FOR RECOVERING DATA UNIT IN WIRELESS COMMUNICATION SYSTEM

CROSS REFERENCE TO RELATED APPLICATIONS

This application is the National Phase of PCT International Application No. PCT/KR2014/005410, filed on Jun. 19, 2014, which claims priority under 35 U.S.C. 119(e) to U.S. Provisional Application No. 61/874,413, filed on Sep. 6, 2013 all of which are hereby expressly incorporated by reference into the present application.

BACKGROUND OF THE INVENTION

Field of the Invention

The present invention relates to wireless communications, and more particularly, to a method and apparatus for recovering a data unit in a wireless local area network (WLAN).

Related Art

A user equipment (UE) supporting the IEEE 802.11a standard may have a transfer rate of up to 54 Mbps when data is transmitted through a 20 MHz channel band at a 5 GHz frequency band on the basis of orthogonal frequency division multiplexing (OFDM).

A UE supporting the IEEE 802.11n standard may have a transfer rate of up to 600 Mbps when data is transmitted through a 20 MHz or 40 MHz channel bandwidth at a 2.4 GHz or 5 GHz frequency band on the basis of multiple input multiple output (MIMO).

The IEEE 802.11ac standard aims to provide a throughput greater than or equal to 1 Gbps in a medium access control (MAC) service access point (SAP) layer. A wireless local area network (WLAN) system supporting the IEEE 802.11ac standard may also be referred to as a very high throughput (VHT) system. For the throughput greater than or equal to 1 Gbps in the MAC SAP layer, the VHT system may support a 80/160 MHz channel band and 8 spatial streams (or space time streams). If the VHT system supports the 160 MHz channel bandwidth, up to 8 spatial streams, 256 quadrature amplitude modulation (QAM), and a short Guard Interval (GI), then the UE supporting the VHT system may have a transfer rate of up to 6.9 Gbps when data is transmitted in a physical layer.

In order to satisfy the aforementioned throughput, a plurality of VHT STAs supporting the VHT system may transmit and receive data through the same channel simultaneously when communicating with an access point (AP). A VHT AP may transmit data simultaneously to the plurality of VHT STAs on the basis of space division multiple access (SDMA) or multiple user (MU)-MIMO. That is, data may be transmitted or received simultaneously between the plurality of VHT STAs and the VHT AP.

With the increase in a demand for high-definition multimedia transmission at present, an unlicensed frequency band is on an increasing trend. Further, it is not easy to ensure a contiguous 160 MHz channel bandwidth in the IEEE 802.11ac due to a channel bandwidth used by the legacy WLAN standard. Therefore, in the IEEE 802.11ac, a 160 MHz channel bandwidth in which non-contiguous channels are aggregated may be used.

SUMMARY OF THE INVENTION

The present invention provides a method of recovering a data unit in a wireless communication system.

The present invention also provides an apparatus for recovering a data unit in a wireless communication system.

In order to achieve the purpose of the aforementioned present invention, according to one aspect of the present invention, a method of recovering a data unit in a wireless local area network (WLAN) is provided. The method may include: determining a channel state of at least one secondary channel band for a specific time after a station (STA) has failed to transmit a first physical layer convergence procedure (PLCP) protocol data unit (PPDU); and transmitting, by the STA, a second PPDU through a recovery channel band determined on the basis of the channel state, wherein the first PPDU is data transmitted through a primary channel band and the at least one secondary channel, and wherein the recovery channel band comprises a secondary channel of which the channel state is idle among the primary channel band and the at least one secondary channel.

In order to achieve the purpose of the aforementioned present invention, according to one aspect of the present invention, an STA for recovering a data unit in a WLAN is provided. The STA may include: a radio frequency (RF) unit implemented to transmit or receive a radio signal; and a processor operatively coupled to the RF unit, wherein the processor is implemented for: determining a channel state of at least one secondary channel band for a specific time after transmission for a first PPDU has failed; and transmitting a second PPDU through a recovery channel band determined on the basis of the channel state, wherein the first PPDU is data transmitted through a primary channel band and the at least one secondary channel, and wherein the recovery channel band comprises a secondary channel of which the channel state is idle among the primary channel band and the at least one secondary channel.

When a recovery procedure of data transmitted through a plurality of channel bands is performed in a wireless local area network (WLAN), an available channel band may be re-determined for the recovery procedure. The data recovery procedure is performed through the re-determination of the available channel, thereby improving data transmission efficiency.

DESCRIPTION OF EXEMPLARY EMBODIMENTS

Figure 1:
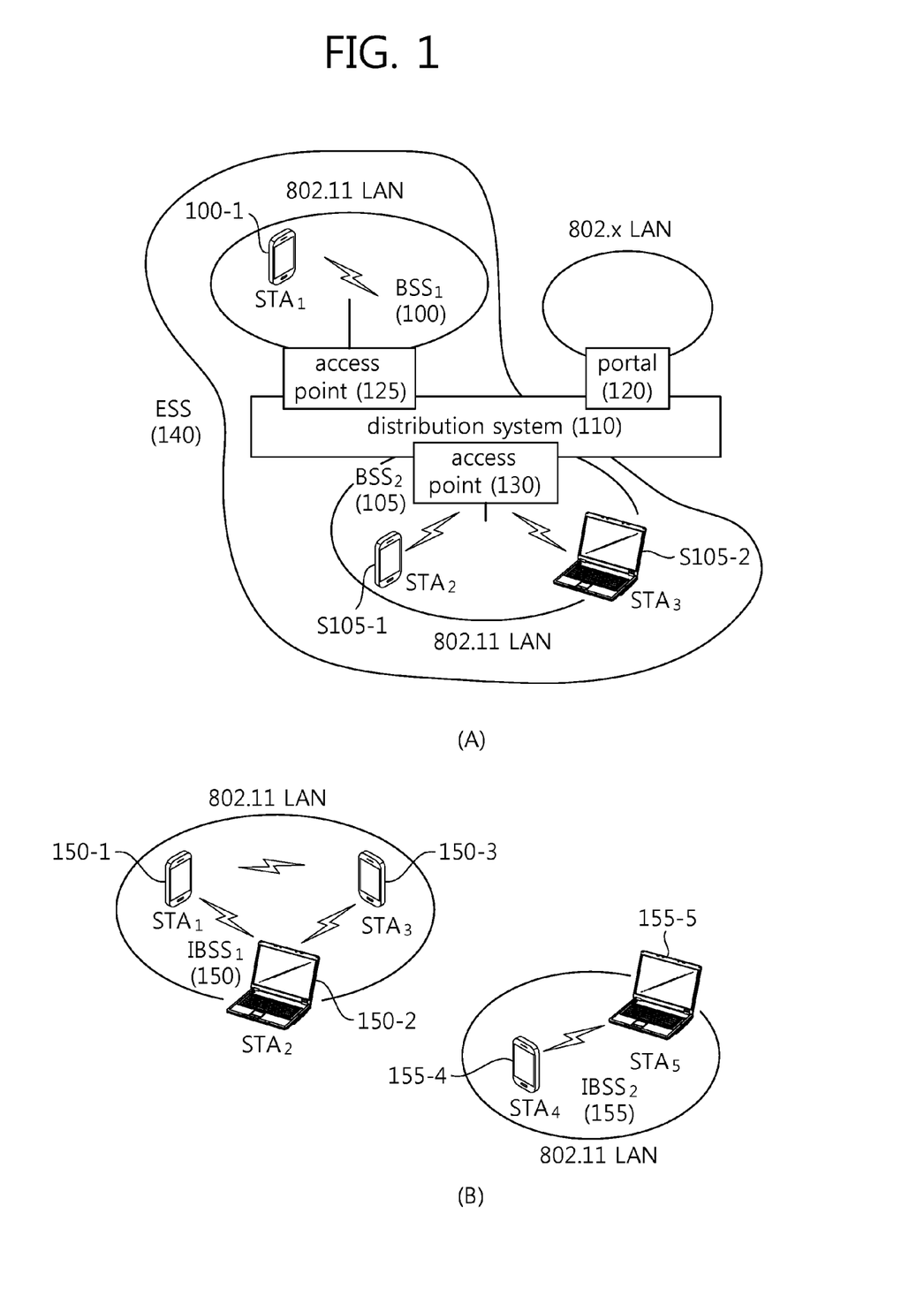
FIG. 1 is a concept view illustrating the structure of a wireless local area network (WLAN).

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
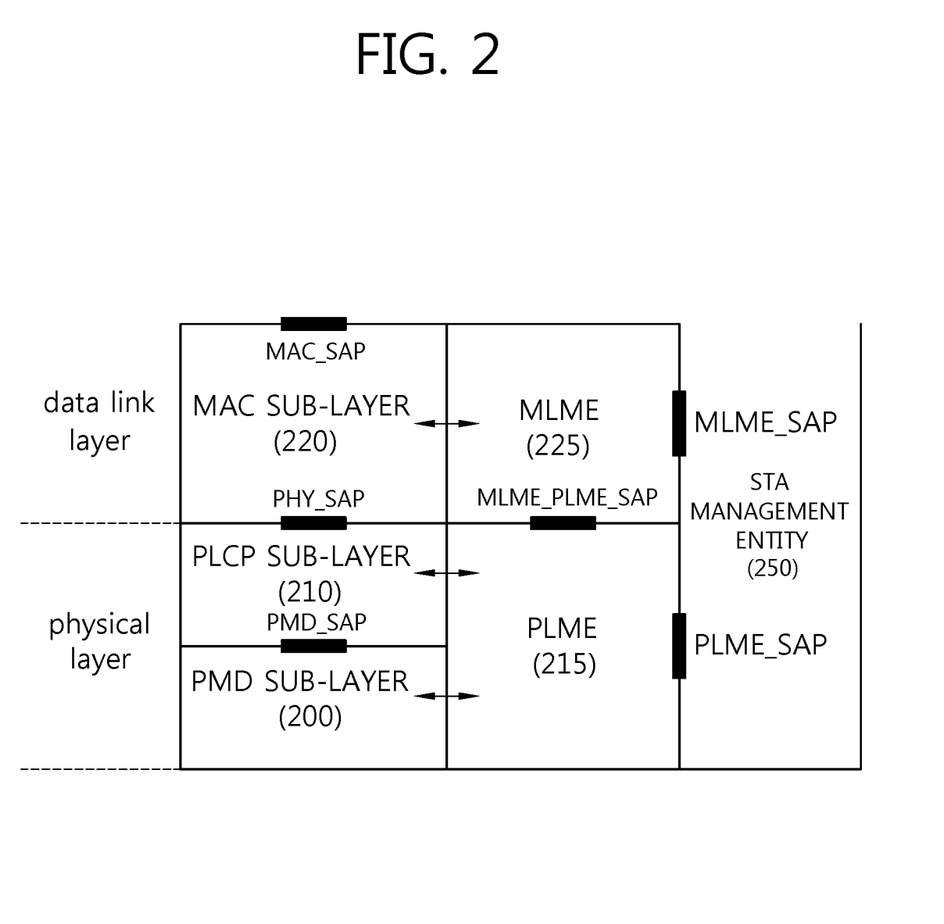
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
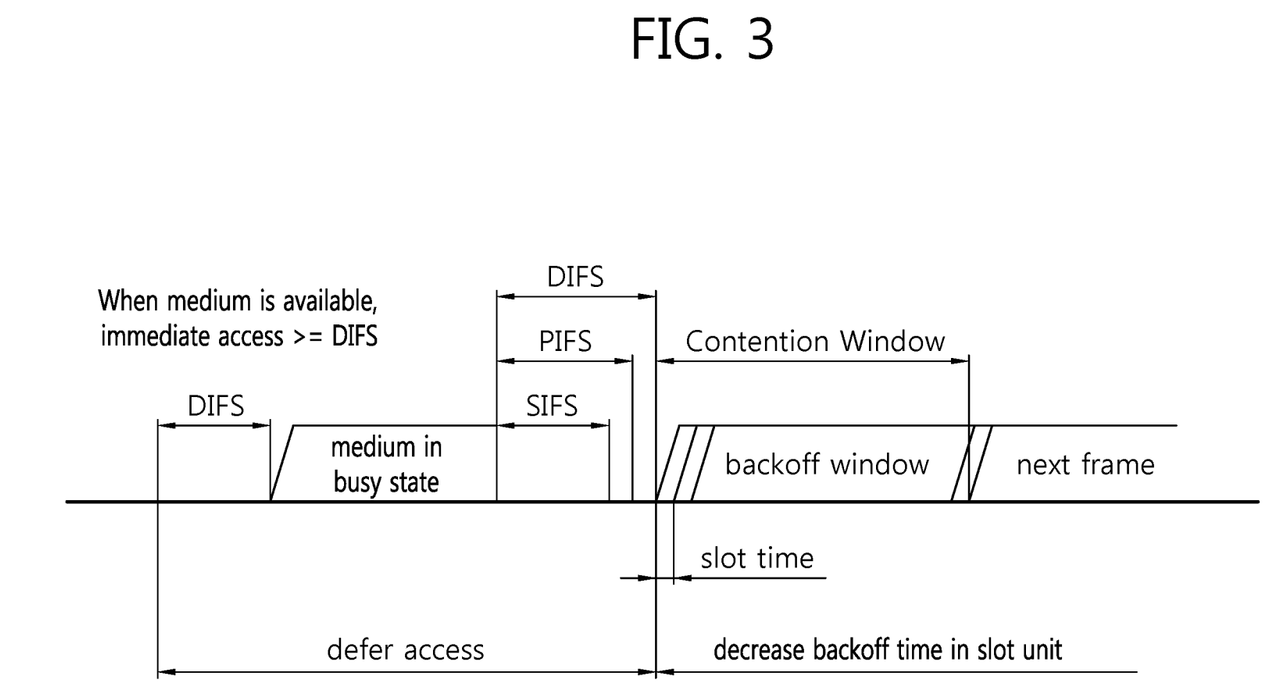
FIG. 3 shows the concept of a distributed coordination function (DCF)-based channel access procedure.

FIG. 3 shows the concept of a distributed coordination function (DCF)-based channel access procedure.

In the DCF-based channel access procedure, an STA may decide whether to use a medium through a carrier sensing mechanism. If the medium is not in use longer than a DCF inter frame symbol (DIFS) duration (i.e., if a channel is idle), the STA may transmit a MAC protocol data unit (MPDU) of which transmission is imminent.

On the contrary, if the medium is in use during the DIFS duration (i.e., if the channel is busy), the STA may set a backoff time according to a random backoff algorithm.

The backoff time is a waiting time before transmitting a frame after the channel waits for a specific time (e.g., DIFS). The backoff time may be defined by Equation 1 below.

BackoffTime=Random( )×aSlotTime  <Equation 1>

Random( ) is a function of calculating a pseudo-random integer selected with uniform distribution in the interval of [0, CW]. CW may be selected from an integer greater than or equal to aCWMin and less than or equal to aCWMax. aCWMin and aCWmax may be determined according to physical (PHY) characteristics. aSlotTime may be a time unit defined according to the PHY characteristics.

The STA may decide whether the channel is idle, and if the channel is idle, may decrease the backoff time in unit of SlotTime. Before the backoff time is decreased in unit of SlotTime, the STA may decide again whether the channel is idle for a duration corresponding to the DIFS. If the backoff time is 0, the STA may perform the channel access.

Figure 4:
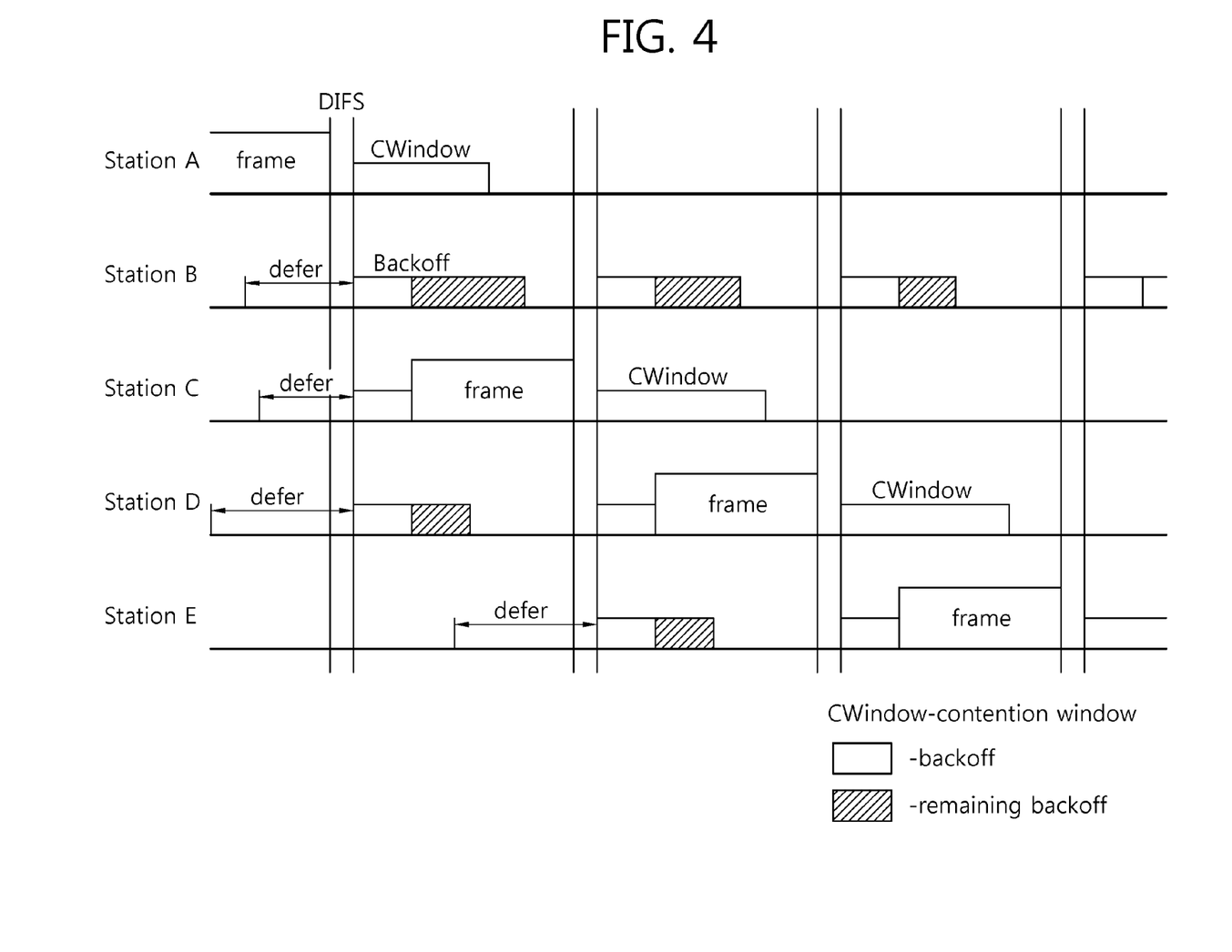
FIG. 4 shows the concept of a backoff procedure of a plurality of STAs.

FIG. 4 shows the concept of a backoff procedure of a plurality of STAs.

Referring to FIG. 4, a backoff time (or a size of a contention window (CW)) may be decreased after it is decided that a medium is idle for a DIFS duration. If an activity of the medium is not detected (if it is decided that the medium is idle), the STA may decrease the backoff time in unit of SlotTime. If it is decided that the medium is not idle, the STA may defer the decrement of the backoff time. When the pre-set backoff timer is decreased to 0, the STA may transmit the frame through the medium.

More specifically, after the frame is transmitted from an STA A, each of an STA B, an STA C, and an STA D may decrease a pre-set backoff time. Among the STA B, the STA C, and the STA D, the STA C of which the backoff time is decreased to 0 most rapidly may transmit the frame through the medium. If the STA C transmits the frame, it is decided that the medium is not idle (i.e., a busy state). Therefore, the decrement of the backoff time of the STA B and the STA D may be deferred.

Before transmitting a data frame by using one of channel access schemes, a channel may be pre-occupied by exchanging a control frame (e.g., an RTS frame and a CTS frame). In case of using the exchange of the RTS frame and the CRS frame, a collision which may occur when the data frame is transmitted may be replaced with a collision by a relatively short control frame. Therefore, a channel waste can be reduced.

A point coordination function (PCF) may be used to share a radio medium of a plurality of STAs in a MAC layer. The aforementioned DCF is a channel access based on a carrier sense multiple access with collision avoidance (CSMA/CA). Therefore, in case of using the DCF-based channel access, real-time transmission of data transmitted between an STA and an AP cannot be guaranteed. On the contrary, the PCF may be used as a method for providing a quality of service (QoS) in real-time data transmission. Unlike the DCF, the PCF is a non-contention based transmission service. The PCF may be used alternately with a DCF-type contention based service, rather than exclusively using the entire medium transmission duration. In the PCF, a point coordinator implemented in the AP of a BSS may use a polling scheme, and a right to occupy the medium for each STA may be controlled on the basis of the polling scheme.

The PCF which is an inter-frame space (IFS) used in the PCF may be set to a value smaller than the DIFS which is an IFS of the DCF. When using this method, an STA which has access to a medium on the basis of the PCF may have a priority over an STA having access to a channel on the basis of the DCF. The IFS denotes an interval between frames, and may be used to set a priority according to which the STA has access to the medium. The IFS may be specifically defined as follows.

Figure 5:
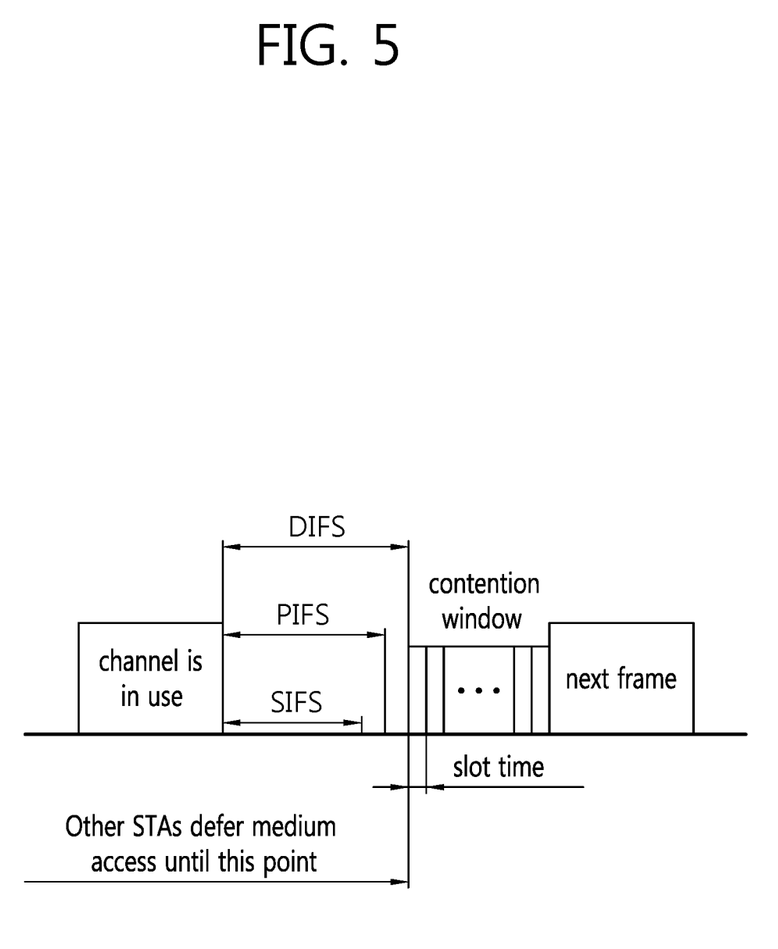
FIG. 5 shows the concept of an interval between frames.

FIG. 5 shows the concept of an interval between frames.

Referring to FIG. 5, an interval between two frames may be referred to as an inter-frame symbol (IFS). An STA may use a carrier sensing scheme to decide whether a channel is used for a time duration of the IFS as defined in the standard. A plurality of IFSs are defined in a MAC layer. A priority of an STA occupying a radio medium may be determined by the IFS. The interval between frames is dependent on an IFS type, and is defined as follow.

(1) SIFS(short inter frame symbol): It is used in RTS/CTS, ACK frame transmission. Top priority.

(2) PIFS(PCF IFS): It is used in frame transmission of an STA operating based on PCF.

(3) DIFS(DCF IFS): It is used in frame transmission of an STA operating based on DCF.

(4) EIFS(extended IFS): It is used only when an error occurs in frame transmission, and is not a fixed duration.

When a DCF is used as a method of sharing a wireless medium by a plurality of STAs in the MAC layer, several problems may occur. For example, if the plurality of STAs simultaneously perform an initial access when using the DCF, frames transmitted by the plurality of STAs may collide. In addition, there is no concept on a transmission priority in the DCF. Therefore, a quality of service (QoS) cannot be guaranteed as to traffic data transmitted by the STA. In order to solve such a problem, a hybrid coordination function (HCF) is defined in IEEE 802.11e as a new coordination function. As a channel access mechanism, the HCF defines an HCF controlled channel access (HCCA) and an enhanced distributed channel access (EDCA).

The EDCA and the HCCA may define traffic categories indicating transmission priorities. A priority for performing a channel access may be determined on the basis of the traffic access categories. That is, different CWs and IFSs may be defined differently according to categories of traffic data transmitted by the STA. The different CWs and IFSs may determine a channel access priority depending on the categories of traffic data.

For example, if traffic data is an e-mail, the traffic data may be assigned to a low priority class for transmission. For another example, if the traffic data is voice communication through a wireless local area network (WLAN), the traffic data may be assigned to a high priority class for transmission.

In case of using EDCA, traffic data having a high priority may have more transmission opportunities than traffic data having a low priority. In addition, on average, an STA which transmits high-priority traffic may have a shorter waiting time than an STA which transmits low-priority traffic before transmitting a packet. In the EDCA, a transmission priority may be implemented by allocating a shorter CW to higher-priority traffic than that of lower-priority traffic while assigning an arbitration inter-frame space (AIFS) that is shorter than the IFS which is a frame interval defined in the DCF. Further, in case of using the EDCA, the STA may have access to a channel without contention during an allocated transmit opportunity (TXOP). The TXOP may indicate a time resource to which a right to perform transmission through a medium is given.

During the TXOP determined within a range not exceeding a maximum duration of the TXOP, the STA may transmit as many packets as possible. If one frame is too long to be entirely transmitted during one TXOP, it may be transmitted by being split into small frames. The use of the TXOP may reduce a situation in which an STA having a low transfer rate excessively occupies a channel, which is a problem of the conventional 802.11 DCF MAC.

In the aforementioned channel access method, a collision may occur in data transmission if an STA incorrectly senses whether a medium is idle when performing medium sensing based on a carrier sensing mechanism.

Hereinafter, according to an embodiment of the present invention, when PPDU transmission is performed in a channel band of 40 MHz/80 MH/160 MHz/80+80 MHz, a method of recovering an error for the PPDU is disclosed.

In the PPDU transmission through the legacy channel bandwidth of 40 MHz, 80 MHz, 160 MHz, or 80+80 MHz, an STA may confirm whether a channel is idle for a time duration corresponding to a PIFS before a TXOP is acquired to transmit the PPDU through a channel bandwidth of 20 MHz, 40 MHz, 80 MHz, 160 MHz, or 80+80 MHz.

A method of transmitting the PPDU on the basis of a result of determining a state of a secondary channel by the STA is disclosed. A case where a state of a primary channel band is idle is assumed as the following cases 1) to 4).

1) As a result of determining a medium of the STA, a 20 MHz secondary channel band, a 40 MHz secondary channel band, and an 80 MHz secondary channel band may be idle during an interval of PIFS before a TXOP starts. In this case, the STA may transmit a PPDU through a channel band of 160 MHz or 80 MHz+80 MHz.

2) As a result of determining a medium of the STA, a 20 MHz secondary channel band and a 40 MHz secondary channel band may be idle during an interval of PIFS before a TXOP starts. In this case, the STA may transmit a PPDU through an 80 MHz primary channel band.

3) As a result of determining a medium of the STA, a 20 MHz secondary channel band may be idle during an interval of PIFS before a TXOP starts. In this case, the STA may transmit a PPDU through a 40 MHz primary channel band.

4) As a result of determining a medium of the STA, a secondary channel band may not be idle. In this case, the STA may transmit a PPDU through a 20 MHz primary channel band.

5) As a result of determining a medium of the STA, if the medium is in a busy state and a backoff timer value is 0 in a primary channel, the STA may re-perform a new backoff procedure.

A duration of AIFS[AC] for a channel access may be determined through the following equation on the basis of a value of AIFSN[AC].

$$AIFS[AC]=AIFSN[AC]\times aSlotTime+aSIFSTime \quad \text{<Equation 1>}$$

The value of AIFSN[AC] for the STA is greater than or equal to 2. In an infrastructure BSS, the AIFSN[AC] may be determined on the basis of an EDCA parameter set element of a beacon frame and probe response frame transmitted by an AP. The value of AIFSN[AC] for the AP may be greater than or equal to 1. If an enhanced distributed channel access function (EDCAF) determines an initiation of a frame exchange sequence, a TXOP may be granted to the EDCAF.

The EDCAF is a function for a channel access based on the EDCA of the STA. One EDCAF may exist for each access category.

In a specific slot boundary, the EDCAF may initiate transmission of the frame exchange sequence for the EDCAF, or may decrement a backoff timer for the EDCAF, or may invoke a backoff procedure due to an internal collision, or may do nothing.

In general, if the PPDU is transmitted or received through the TXOP acquired by the STA, the STA may transmit or receive multiple PPDUs with an interval of SIFS during the TXOP. If the STA fails to receive an immediate response frame (e.g., ACK) for a frame transmitted during the TXOP, the STA may perform a PPDU recovery procedure.

In the TXOP, transmission of multiple frames may be performed by the STA as follows.

If there is one or more frames pending in a specific AC for which a channel has been acquired, the multiple frames may be transmitted in a specific TXOP. Other frames pending in another AC cannot be transmitted in the specific TXOP.

A TXOP holder may have in its transmit queue an additional frame of the same AC as the one just transmitted, and a sum of a transmit duration for that frame and a transmit duration for predicted ACK of that frame may be less than a residual TXNAV timer value. In this case, the STA may complete a preceding frame exchange sequence according to a TXOP limit restriction and thereafter may start transmission of the frame after an SIFS.

The TXNAV timer may be initialized on the basis of a duration of the Duration/ID field included in a frame successfully transmitted most recently by the TXOP holder.

After a valid response to an initial frame in the TXOP, the Duration/ID field may be set for transmission of the multiple frames, and a subsequent transmission failure may occur. In this case, a carrier sensing mechanism for a 20 MHz primary channel indicates that a medium is idle at a TxPIFS slot boundary before the expiry of the TXNAV timer, and thereafter the STA may transmit a frame on the basis of the EDCAF. At the expiry of the TXNAV timer, if the STA cannot access a medium on the basis of the EDCAF, the EDCAF can perform the backoff procedure.

A transmission success and transmission failure of a frame to be transmitted by the STA through a channel access may be defined as follows.

The STA may transmit an MPDU (herein, an MPDU transmitted through an A-MPDU is also included) requiring an immediate frame as a response. After transmission of the MPDU, the STA may wait for a timeout interval corresponding to a duration of aSIFSTime+aSlotTime+aPHY-RX-START-Delay after a PHY-TXEND.confirm primitive occurs in a PHY layer. If the PHYRXSTART.indication primitive does not occur during the timeout interval, the STA may determine that the transmission of the MPDU has failed.

If the PHY-RXSTART.indication primitive occurs during the timeout interval, the STA may wait for a PHY-RXEND-.indication primitive corresponding to the MPDU transmitted to determine whether the MPDU transmission is successful. The PHY-RXEND.indication primitive corresponding to the transmitted MPDU may indicate that a valid response frame for the transmitted MPDU is received from a receiving end.

A recognition on reception on a different valid frame may be interpreted as an MPDU transmission failure, rather than a recognition on reception on a valid response frame corresponding to the transmitted MPDU. A recognition on a valid data frame transmitted by the receiving end of a PS-poll frame may be accepted as a successful acknowledgement of the PS-poll frame. Transmission which does not require an immediate frame as a response may also be defined as successful transmission.

Hereinafter, an embodiment of the present invention discloses a PPDU recovery procedure when transmission on a PPDU has failed.

Figure 6:
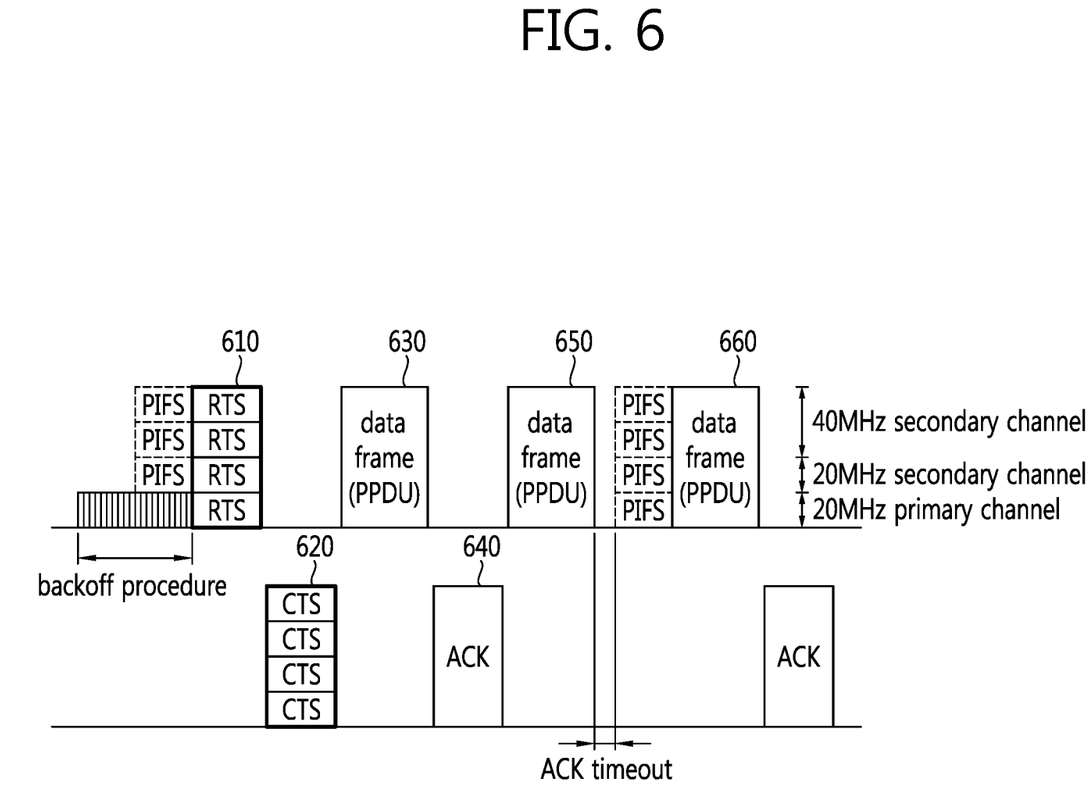
FIG. 6 shows the concept of a PPDU recovery procedure according to an embodiment of the present invention.

FIG. 6 shows the concept of a PPDU recovery procedure according to an embodiment of the present invention.

In FIG. 6, a PPDU recovery procedure of an STA is disclosed when a transmission failure occurs after a PPDU is transmitted through an 80 MHz channel band. For convenience, a PPDU recovery procedure of an AP is described in FIG. 6 under the assumption that the AP transmits an RTS 610 to the STA, the AP receives a CTS 620 from the STA, and the AP transmits data frames 630, 650, and 660 to the STA. However, when the STA transmits the data frame to the AP, the PPDU recovery procedure of the STA may also be performed in the same manner.

For example, a 20 MHz channel band as one of four 20 MHz channel bands included in the 80 MHz channel band may be set as a primary channel for a TXOP initial access. The AP may perform a back-off procedure for the channel access for the set primary channel. Specifically, the AP may perform the TXOP initial access through the back-off procedure in the primary channel.

The AP may confirm a channel state of a secondary channel during a PIFS prior to the expiry of a back-off timer. The secondary channel may include the remaining channels, i.e., a 20 MHz secondary channel and a 40 MHz secondary channel, other than the 20 MHz primary channel in the 80 MHz channel band.

The AP may decide the channel state during the PIFS prior to a TXOP to determine whether the secondary channel is idle or busy. If the AP is idle during the PIFS in the secondary channel, the AP may decide that the secondary channel is in an idle state. Although it is assumed in FIG. 6 that all secondary channels are idle for convenience, a channel decided as being in a busy state may be present among the secondary channels. A frame may not be transmitted through the secondary channel decided as being in the busy state.

The AP may transmit the RTS frame 610 of a duplicated physical protocol data unit (PPDU) through a primary channel which has performed a channel access and each secondary channel of which a channel state is decided as an idle state. The RTS frame 610 of the duplicated PPDU format may has a format duplicated from an RTS frame format transmitted through the primary channel band. The AP may transmit the RTS frame 610 of the duplicated format in an equally set time.

A case where all secondary channels have an idle state is assumed in FIG. 6. Therefore, the RTS frame 610 of the duplicated PPDU format may be transmitted through an 80 MHz channel band including the primary channel and the secondary channel.

The STA may transmit the CTS frame 620 to the AP in response to the RTS frame 610 received from the AP. The STA may transmit the CTS frame 620 through the 80 MHz channel band. The CTS frame 620 may have the duplicated PPDU format.

If the AP transmits data to a plurality of STAs on the basis of MU-MIMO transmission, the plurality of STAs may transmit the CTS frame to the AP through channel bands respectively allocated. Hereinafter, a case where the AP communicates with one STA is assumed for convenience in an embodiment of the present invention.

Upon receiving the CTS frame 620 from the STA through the 80 MHz channel band, the AP may transmit the data frame 630 to the STA. The AP may transmit the data frame 630 to the STA through the 80 MHz channel band. If the data frame 630 is successfully received, the STA may transmit an ACK 640 through the 80 MHz channel bandwidth in response to the data frame 630 transmitted from the AP. For example, the STA may transmit a block ACK through each of four 20 MHz channels included in the 80 MHz channel. Hereinafter, the data frame may be interpreted as a PPDU in a broad sense in the embodiment of the present invention.

In a PPDU retransmission method according to the embodiment of the present invention, an operation of the AP is disclosed when the AP fails to receive an ACK for the data frame 650 transmitted from the STA for a time duration corresponding to an ACK timeout (or a timeout). For example, the ACK timeout may be a duration corresponding to a duration of aSIFSTime+aSlotTime+aPHY-RX-START-Delay. The aSIFSTime and the aSlotTime may be defined in a physical layer. The aSIFSTime may be a fixed time unit, and the aSlotTime may dynamically vary depending on a propagation time change. The aSIFSTime may be used when a MAC layer and the physical layer receive a last symbol of a frame through a radio interface and process the received frame, and may indicate a time required to transmit a response frame for the received frame through a radio medium. The aSlotTime may be used to define a PIFS and DIFS duration in the MAC layer. The aPHY-RX-START-Delay may indicate a delay for an issuance of a PHY-RXSTART.indication primitive.

For the PPDU recovery procedure, the AP may perform carrier sensing on a primary channel and a secondary channel to confirm a channel state during a PIFS starting from an ACK timeout point. If the channel state is idle as a result of carrier sensing, a pending frame may be transmitted. The pending frame to be transmitted through the PPDU recovery procedure may include data included in a transmission failure frame for which an ACK cannot be received. That is, a transmission failure data frame and a data frame to be transmitted on the basis of the PPDU recovery procedure may include duplicated data.

It is assumed in FIG. 6 that a channel state of a 20 MHz secondary channel band and a 40 MHz secondary channel band is idle as a result of performing carrier sensing during the PIFS starting from the ACK timeout point. In this case, the AP may transmit the data frame 660 generated on the basis of the PPDU recovery procedure through the 80 MHz channel band.

For another example, if the channel state is busy as a result of performing carrier sensing on some secondary channels during the PIFS starting from the ACK timeout point, after the PPDU recovery procedure, the some secondary channels in the busy state may not be used for data frame transmission. For example, data frame transmission may be performed through a reduced bandwidth of the 40 MHz channel band, rather than previous data frame transmission through the 80 MHz channel band.

That is, after first PPCU transmission has failed, the STA may decide a channel state of at least one secondary channel band during a specific time. The first PPDU may be data transmitted through the primary channel band and the at least one secondary channel.

The STA may transmit a second PPDU through a recovery channel band formed on the basis of the decided channel state. The channel band allocated through the PPDU recovery procedure may be referred to as a recovery channel band. The recovery channel band for transmitting the second PPDU may include the primary channel band and a secondary channel of which a channel state is idle among the at least one secondary channel.

Figure 7:
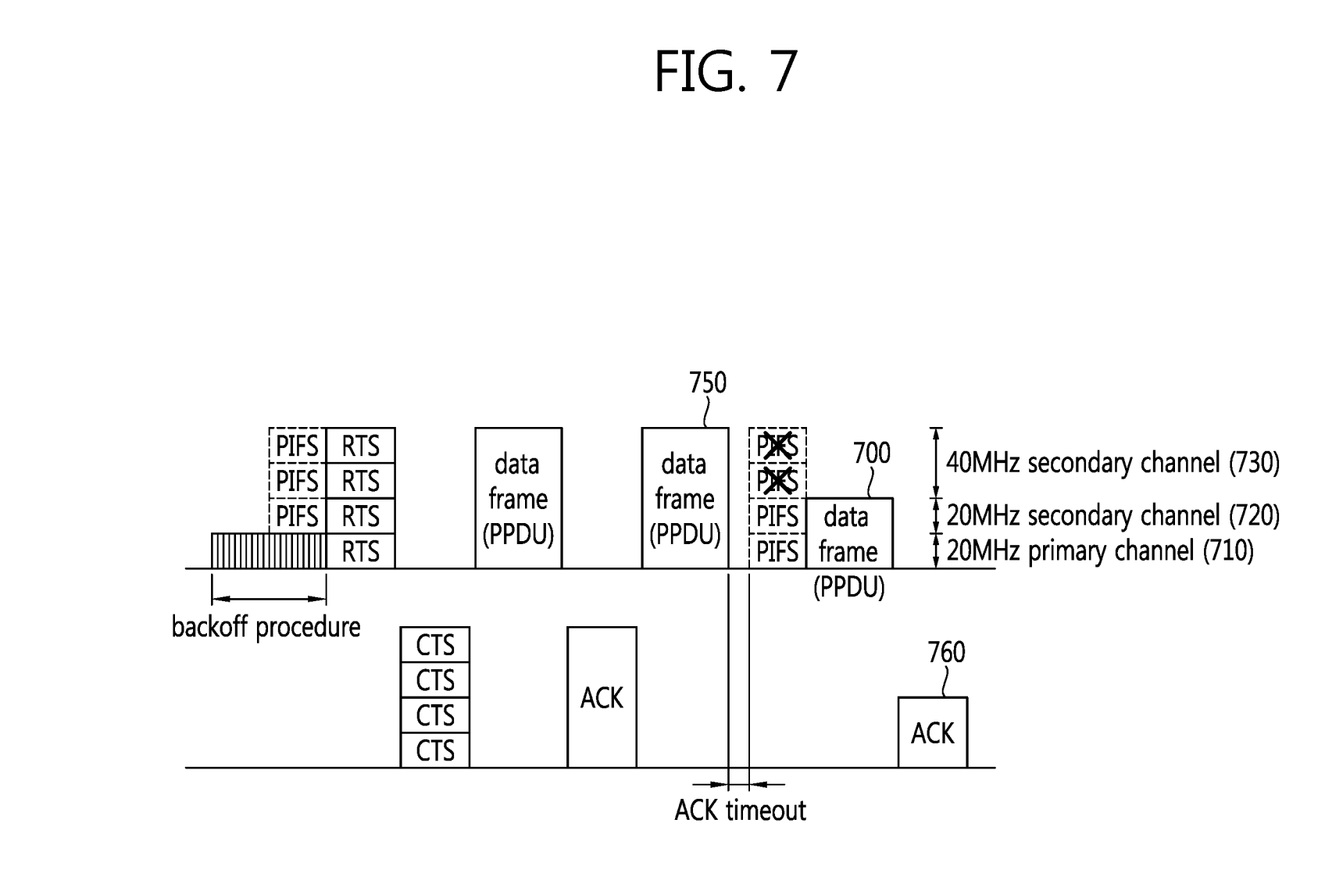
FIG. 7 shows the concept of a PPDU recovery procedure according to an embodiment of the present invention.

FIG. 7 shows the concept of a PPDU recovery procedure according to an embodiment of the present invention.

In FIG. 7, a PPDU recovery procedure is disclosed when a channel state of some channel bands is busy as a result of performing carrier sensing during a PIFS starting from an ACK timeout point.

Referring to FIG. 7, it is shown a case where a channel state of a primary channel 710 and a 20 MHz secondary channel 720 is idle and a channel state of a 40 MHz secondary channel 730 is busy as the result of performing carrier sensing during the PIFS starting from the ACK timeout point.

In this case, an AP may perform a PPDU recovery procedure through the 40 MHz channel band including the primary channel 710 and the secondary channel 720. A data frame 700 to be transmitted through the 40 MHz channel band may include data included in a data frame (e.g., PPDU) 750 in which previous transmission has failed, on the basis of the PPDU recovery procedure.

The STA may receive the data frame 700 to be transmitted through the 40 MHz channel band on the basis of the PPDU recovery procedure. If transmission of the data frame is successful, the STA may transmit an ACK 760 to the AP through the 40 MHz channel band including the primary channel and the 20 MHz secondary channel.

Although the PPDU recovery procedure is disclosed for 80 MHz in FIG. 6 and FIG. 7, the PPDU recovery procedure for 40 MHz, 160 MHz, or 80+80 MHz may also be performed by discovering the channel state of the primary channel and the secondary channel during the PIFS.

For example, if PPDU transmission is allowed through a channel band of 40 MHz, 80 MHz, 160 MHz, or 80+80 MHz at a specific TXOP, the PPDU recovery procedure is as follows.

After a valid response to an initial frame in the TXOP, the duration/ID field may be set for transmission of the multiple frames, and a subsequent transmission failure may occur. In this case, a carrier sensing mechanism for a 20 MHz primary channel indicates that a medium is idle at a TxPIFS slot boundary before the expiry of the TXNAV timer, and thereafter the STA may transmit a frame on the basis of the EDCAF.

For the PPDU recovery, the STA may perform the PPDU recovery procedure through one of the following cases. The 20 MHz primary channel band, the 20 MHz secondary channel band, the 2 MHz secondary channel band, the 40 MHz secondary channel band, the 40 MHz secondary channel band, and the 80 MHz secondary channel band may be neighboring channel bands. The channel band allocated through the PPDU recovery procedure may be referred to as a recovery channel band.

1) If the 20 MHz primary channel, the 20 MHz secondary channel, the 40 MHz secondary channel, and the 80 MHz secondary channel are idle during an interval of PIFS after a preceding transmission failure, the STA may transmit a PPDU through a channel band of 160 MHz or 80 MHz+80 MHz. The channel band of 160 MHz or 80 MHz+80 MHz may be formed on the basis of the 20 MHz primary channel band, the 20 MHz secondary channel band, the 40 MHz secondary channel band, and the 80 MHz secondary channel band.

2) If the 20 MHz primary channel, the 20 MHz secondary channel band, and the 40 MHz secondary channel band are idle during an interval of PIFS after a preceding transmission failure, the STA may transmit a PPDU through an 80 MHz primary channel band. The 80 MHz primary channel band may be formed on the basis of the 20 MHz primary channel band, the 20 MHz secondary channel band, and the 40 MHz secondary channel band, 3) If the 20 MHz primary channel and the 20 MHz secondary channel band are idle during an interval of PIFS after a preceding transmission failure, the STA may transmit a PPDU through the 40 MHz primary channel band. The 40 MHz primary channel band may be formed on the basis of the 20 MHz primary channel band and the 20 MHz secondary channel band.

4) If only the 20 MHz primary channel band is idle during an interval of PIFS after a preceding transmission failure, the STA transmits a PPDU through the 20 MHz primary channel band.

5) The STA may perform a back-off procedure if the primary channel band is in a busy state and a back-off timer is 0.

The STA may perform the PPDU recovery procedure in a channel band having various sizes through the aforementioned method.

If it is assumed a case where the AP performs the PPDU recovery procedure, a channel discover for transmitting data after the PPDU recovery procedure may be performed variously.

Figure 8:
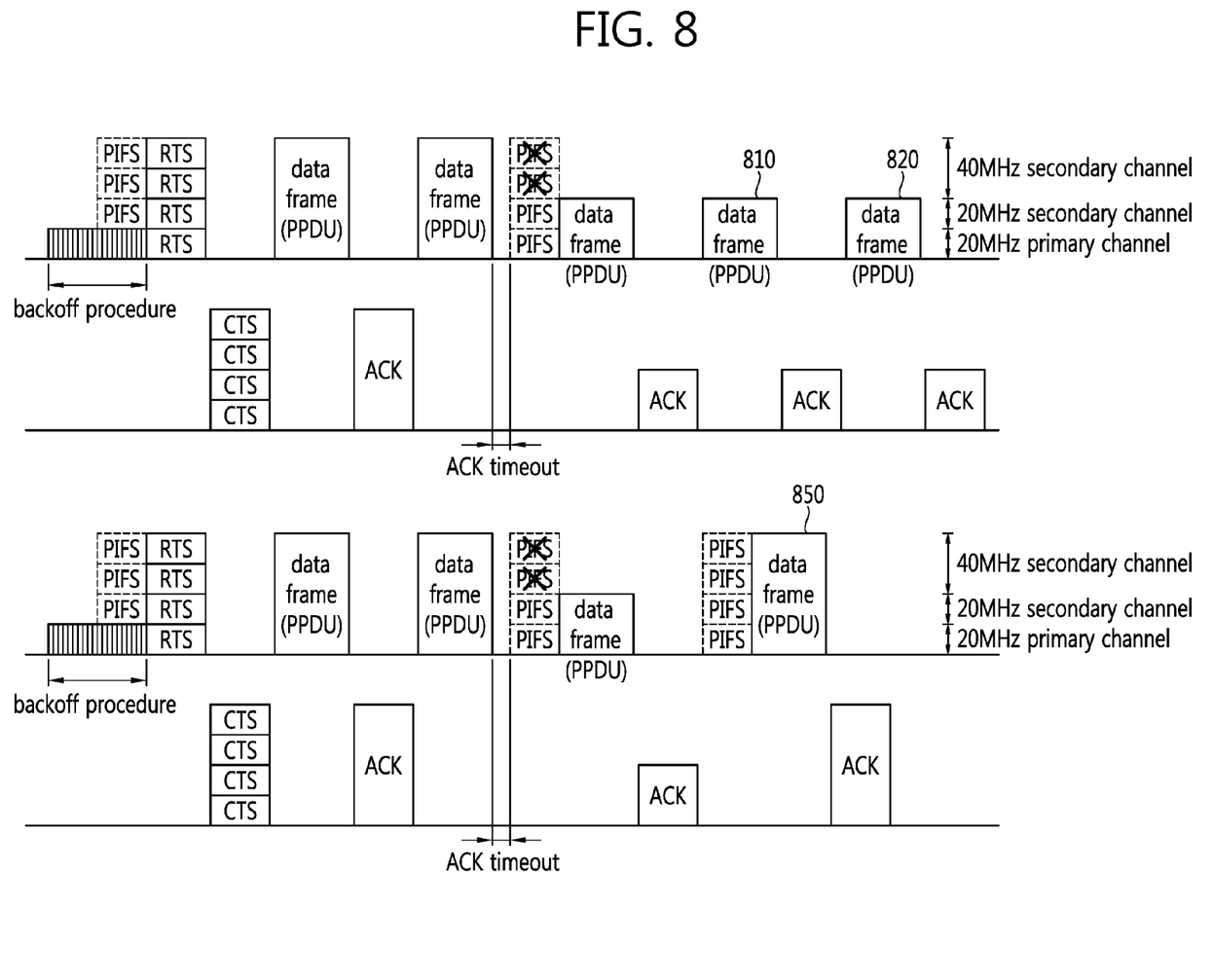
FIG. 8 shows the concept of an operation performed after a PPDU recovery procedure according to an embodiment of the present invention.

FIG. 8 shows the concept of an operation performed after a PPDU recovery procedure according to an embodiment of the present invention.

In FIG. 8, it is disclosed a method in which data is transmitted after an STA performs the PPDU recovery procedure.

Referring to an upper portion of FIG. 8, the STA may persistently use a channel band discovered as being idle in the PPDU recovery procedure during an acquired TXOP so that data frames 810 and 820 are transmitted to the STA.

Referring to a lower portion of FIG. 8, if a channel band allocated for an initial frame in the TXOP is greater in size than a channel band allocated through the PPDU recovery procedure, the STA may re-perform the PPDU recovery procedure during the acquired TXOP. As shown in the aforementioned example of FIG. 7, a valid response to an initial frame in the TXOP may be performed through the 80 MHz channel band, and thereafter an available channel band may be decreased to 40 MHz through the PPDU recovery procedure. In this case, the STA may re-perform the PPDU recovery procedure to decide whether a channel band allocated for the initial frame in the TXOP is available. If it is decided that the channel band (e.g., the 80 MHz channel band) in which the initial frame is transmitted through the PPDU recovery procedure is available, the STA may re-transmit a data frame 850 through the 80 MHz channel band.

Figure 9:
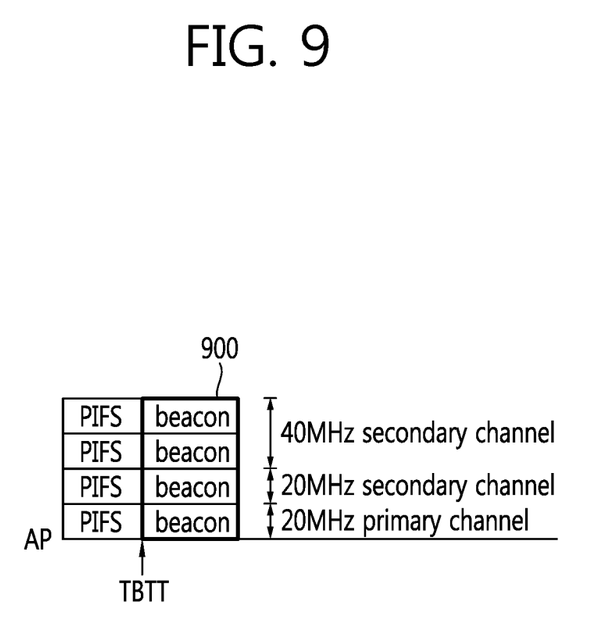
FIG. 9 shows the concept of a PPDU transmission method according to an embodiment of the present invention.

FIG. 9 shows the concept of a PPDU transmission method according to an embodiment of the present invention.

A case where an STA always performs a random back-off procedure when performing an initial access to acquire a TXOP is assumed in the aforementioned embodiment. However, the random back-off procedure is not always performed when the STA performs the initial access to acquire the TXOP.

Referring to FIG. 9, for example, a case where an AP transmits a beacon frame 900 in a target beacon transmission time (TBTT) may be assumed. If a channel is idle during a PIFS as a result of performing carrier sensing, the AP may transmit the beacon frame 900 without having to perform the random back-off procedure. That is, if the AP transmits the duplicated beacon frame 900 through a 40 MHz, 80 MHz, 160 MHz, or 80+80 MHz channel bandwidth, the AP may perform carrier sensing in a primary channel band and a secondary channel band (e.g., a 20 MHz secondary channel band, a 40 MHz secondary channel band, and an 80 MHz secondary channel band) to confirm whether the channel is idle during the PIFS time.

The AP may transmit the beacon frame 900 through a channel band formed on the basis of the primary channel band and/or secondary channel band in the idle state.

A method in which the STA transmits a PPDU through a channel band determined on the basis of carrier sensing is described below. Herein, the PPDU may correspond to a frame, such as the beacon frame 900, transmitted without an additional back-off procedure in initial transmission.

1) If the 20 MHz primary channel band, the 20 MHz secondary channel band, the 40 MHz secondary channel band, and the 80 MHz secondary channel band are idle during an interval of PIFS after a carrier sensing mechanism indicates that a medium is idle, the STA transmits the PPDU through the 160 MHz or 80 MHz+80 MHz channel band.

2) If the 20 MHz primary channel band, the 20 MHz secondary channel band, and the 40 MHz secondary channel band are idle during an interval of PIFS after a carrier sensing mechanism indicates that a medium is idle, the STA transmits the PPDU through the 80 MHz primary channel band. The 80 MHz primary channel band may be formed on the basis of the 20 MHz primary channel band, the 20 MHz secondary channel band, and the 40 MHz secondary channel band.

3) If the 20 MHz primary channel band and the 20 MHz secondary channel band are idle during an interval of PIFS after a carrier sensing mechanism indicates that a medium is idle, the STA transmits the PPDU through the 40 MHz primary channel band. The 40 MHz primary channel band may be formed on the basis of the 20 MHz primary channel band and the 20 MHz secondary channel band.

4) If only the 20 MHz primary channel band is idle during an interval of PIFS after a carrier sensing mechanism indicates that a medium is idle, the STA transmits the PPDU through the 20 MHz primary channel band.

5) The STA may perform a back-off procedure if the primary channel band is in a busy state and a back-off timer is 0.

Such operations may also be applied when the AP transmits a channel switch announcement frame, a traffic indication map (TIM) frame, or the like in addition to the beacon frame.

In the above decision, the STA may preferentially decide the channel state of the primary channel during a PIFS, and if it is decided that the primary channel is idle, may decide the channel state of the secondary channel during the PIFS in which the channel state of the primary channel is decided. For example, the STA may acquire information regarding the channel state of the secondary channel and then, if the channel state of the primary channel is idle, the STA may preferentially decide the acquired channel state of the secondary channel during the PIFS.

Figure 10:
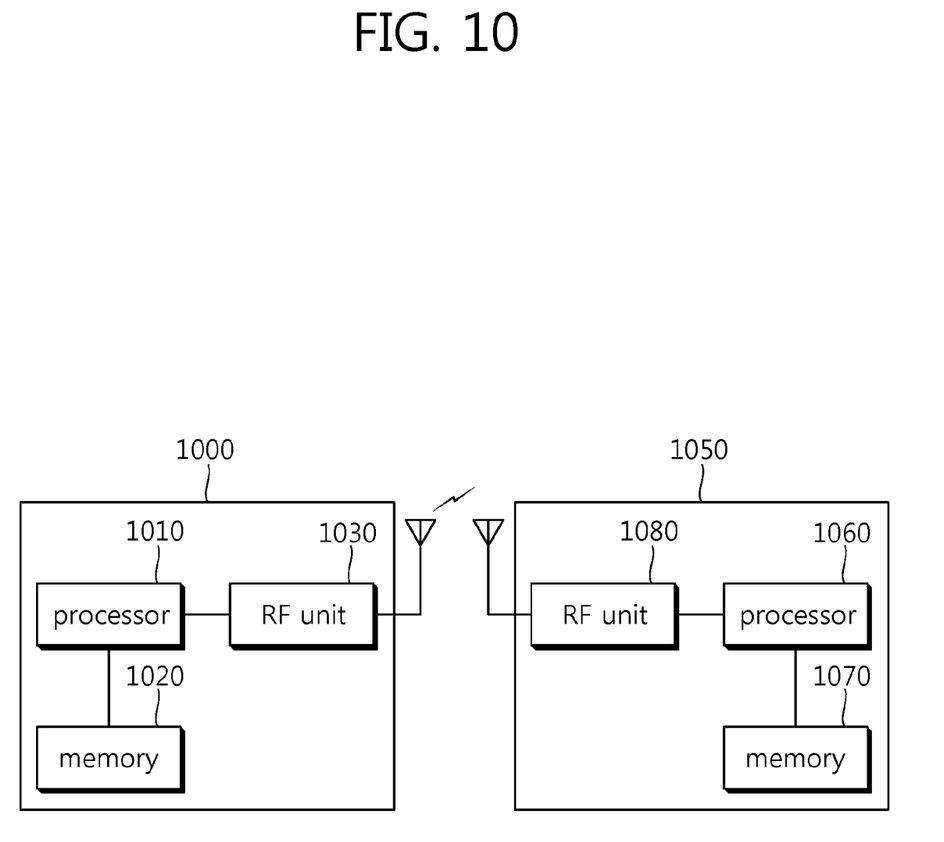
FIG. 10 is a block diagram illustrating a wireless device to which an embodiment of the present invention may apply.

FIG. 10 is a block diagram illustrating a wireless device to which an embodiment of the present invention may apply.

Referring to FIG. 10, the wireless device may be an STA that may implement the above-described embodiments, and the wireless device may be an AP 1050 or a non-AP STA (or STA) (1000).

The STA 1000 includes a processor 1010, a memory 1020, and an RF (Radio Frequency) unit 1030.

The RF unit 1030 may be connected with the processor 1010 to transmit/receive radio signals.

The processor 1010 implements functions, processes, and/or methods as proposed herein. For example, the processor 1010 may be implemented to perform the operation of the above-described wireless device according to an embodiment disclosed in FIG. 6 to FIG. 9 of the present invention.

For example, the processor 1010 may be implemented to perform a method of recovering a data unit in a wireless local area network (WLAN). The processor 1010 may be implemented to decide a channel state of at least one secondary channel band during a specific time after transmission for a first PPDU has failed, and to transmit a second PPDU through a recovery channel band determined on the basis of the channel state. The first PPDU is data to be transmitted through a primary channel band and the at least one secondary channel, and the recovery channel band may include the primary channel band and a secondary channel band of which a channel state is idle among the at least one secondary channel.

The AP 1050 includes a processor 1060, a memory 1070, and an RF (Radio Frequency) unit 1080.

The RF unit 1080 may be connected with the processor 1060 to transmit/receive radio signals.

The processor 1060 implements functions, processes, and/or methods as proposed herein. For example, the processor 1060 may be implemented to perform the operation of the above-described wireless device according to an embodiment disclosed in FIG. 6 to FIG. 9 of the present invention.

For example, the processor 1060 may be implemented to perform the method of recovering the data unit in the WLAN. The processor 1060 may be implemented to decide a channel state of at least one secondary channel band during a specific time after transmission for a first PPDU has failed, and to transmit a second PPDU through a recovery channel band determined on the basis of the channel state. The first PPDU is data to be transmitted through a primary channel band and the at least one secondary channel, and the recovery channel band may include the primary channel band and a secondary channel band of which a channel state is idle among the at least one secondary channel.

The processor 1010, 1020 may include an ASIC (Application-Specific Integrated Circuit), other chipset, a logic circuit, a data processing device, and/or a converter that performs conversion between a baseband signal and a radio signal. The memory 1020, 1070 may include a ROM (Read-Only Memory), a RAM (Random Access Memory), a flash memory, a memory card, a storage medium, and/or other storage device. The RF unit 1030, 1080 may include one or more antennas that transmit and/or receive radio signals.

When an embodiment is implemented in software, the above-described schemes may be embodied in modules (processes, or functions, etc.) performing the above-described functions. The modules may be stored in the memory 1020, 1070 and may be executed by the processor 1010, 1060. The memory 1020, 1070 may be positioned in or outside the processor 1610, 1660 and may be connected with the processor 1010, 1060 via various well-known means.

What is claimed is:

1. A method of transmitting a data unit for error recovery in a wireless local area network (WLAN), the method comprising:

performing, by a station (STA), a backoff procedure to acquire a transmission opportunity (TXOP) based on a primary channel, wherein the primary channel is predetermined among a plurality of channels;

acquiring, by the STA, the TXOP during a TXOP duration corresponding to a certain amount of time through a completion of the backoff procedure;

if at least one secondary channel is idle during a first interval immediately preceding a start of the TXOP duration, transmitting, by the STA, a first physical layer protocol data unit (PPDU) to an access point (AP) through the primary channel and the at least one secondary channel, wherein the at least one secondary channel belongs to remaining channels other than the primary channel among the plurality of channels; and if an acknowledgment (ACK) frame for the first PPDU is not received from the AP, transmitting, by the STA, a second PPDU through a recovery channel band to recover the first PPDU, wherein a bandwidth of the recovery channel band is determined based on whether the at least one secondary channel is idle during a second interval immediately preceding a start the transmission of the second PPDU.

2. The method of claim 1, wherein the at least one secondary channel corresponds to a secondary 20 MHz channel and a secondary 40 MHz channel.

3. The method of claim 2, wherein the recovery channel band is determined to be a 40 MHz channel corresponding to the primary channel and the secondary 20 MHz channel, when the secondary 20 MHz channel is idle during the second interval and the secondary 40 MHz channel is busy during the second interval, and wherein the recovery channel band is determined to be a 20 MHz channel corresponding to the primary channel, when the secondary 20 MHz channel and the secondary 40 MHz are busy during the second interval.

4. The method of claim 2, wherein the recovery channel band is determined to be an 80 MHz channel corresponding to the primary channel, the secondary 20 MHz channel and the secondary 40 MHz channel, when the secondary 20 MHz channel and the secondary 40 MHz are idle during the second interval.

5. The method of claim 1, wherein data included in the second PPDU overlaps with data included in the first PPDU.

6. A station (STA) for transmitting a data unit for error recovery in a wireless local area network (WLAN), the STA comprising:

a transceiver; and a processor operatively connected to the transceiver and configured to:

perform a backoff procedure to acquire a transmission opportunity (TXOP) on a primary channel, wherein the primary channel is predetermined among a plurality of channels, acquire the TXOP during a TXOP duration corresponding to a certain amount of time through a completion of the backoff procedure, if at least one secondary channel is idle during a first interval immediately preceding a start of the TXOP duration, control the transceiver to transmit a first physical layer protocol data unit (PPDU) to an access point (AP) through the primary channel and the at least one secondary channel, wherein the at least one secondary channel belongs to remaining channels other than the primary channel among the plurality of channels, and if an acknowledgment (ACK) frame for the first PPDU is not received from the AP, control the transceiver to transmit a second PPDU through a recovery channel band to recover the first PPDU, wherein a bandwidth of the recovery channel band is determined based on whether the at least one secondary channel is idle during a second interval immediately preceding a start the transmission of the second PPDU.

7. The STA of claim 6, wherein the at least one secondary channel corresponds to a secondary 20 MHz channel and a secondary 40 MHz channel.

8. The STA of claim 7, wherein the recovery channel band is determined to be a 40 MHz channel corresponding to the primary channel and the secondary 20 MHz channel, when the secondary 20 MHz channel is idle during the second interval and the secondary 40 MHz channel is busy during the second interval, and wherein the recovery channel band is determined to be a 20 MHz channel corresponding to the primary channel, when the secondary 20 MHz channel and the secondary 40 MHz are busy during the second interval.

9. The STA of claim 7, wherein the recovery channel band is determined to be an 80 MHz channel corresponding to the primary channel, the secondary 20 MHz channel and the secondary 40 MHz channel, when the secondary 20 MHz channel and the secondary 40 MHz channel are idle during the second interval.

10. The STA of claim 6, wherein data included in the second PPDU overlaps with data included in the first PPDU.

* * * * *